United States Patent [19]

Röhm

[11] 4,029,325
[45] June 14, 1977

[54] CHUCK WITH RADIALLY ADJUSTABLE JAWS

[76] Inventor: Günter Horst Röhm, Heinrich-Rohm-Str. 50, Sontheim, Germany, 7927

[22] Filed: July 9, 1976

[21] Appl. No.: 704,046

[30] Foreign Application Priority Data

July 29, 1975 Germany .......................... 2533770

[52] U.S. Cl. ............................................. 279/123
[51] Int. Cl.² .................. B23B 31/06; B23B 31/16
[58] Field of Search ........... 279/1 A, 121, 123, 110

[56] References Cited

UNITED STATES PATENTS

| 1,454,148 | 5/1923 | Bisset | 279/123 |
| 2,401,971 | 6/1946 | Schuster | 279/123 |
| 2,464,507 | 3/1949 | Hohwart et al. | 279/123 X |
| 3,104,474 | 9/1963 | Rehart | 279/110 X |
| 3,166,336 | 1/1965 | Goodrum | 279/123 |
| 3,679,221 | 7/1972 | Behrens | 279/123 X |

Primary Examiner—Othell M. Simpson
Assistant Examiner—Horace M. Culver
Attorney, Agent, or Firm—Karl F. Ross; Herbert Dubno

[57] ABSTRACT

In a chuck with a plurality of two-part jaws each jaw has a radial clamping means bearing on mating formations consisting of a dovetail-shaped bar and groove which permit removal of a workpiece-engaging part in a transverse (i.e. tangential) direction.

12 Claims, 6 Drawing Figures

CHUCK WITH RADIALLY ADJUSTABLE JAWS

FIELD OF THE INVENTION

My present invention relates to a multiple jaw chuck. More particularly this invention relates to chuck jaws comprising two separable parts for three-jaw and like chucks having radially movable jaws.

BACKGROUND OF THE INVENTION

In a traditional chuck which employs two-part jaws, each jaw comprises an adjustable carrier part to which is fixed a workpiece-engaging part. In order to accommodate a removable work-engaging part, the carrier has necessarily required a special form, often using a mating gear system with the work-engaging part. This special form prevented the use of more conventional jaws on a chuck so constructed.

Attachment or removal of such a specially designed work-engaging part entailed a precise matching of corresponding parts, and could be a time-consuming, exacting process.

OBJECTS OF THE INVENTION

It is therefore an object of my invention to provide an improved chuck of the above-described type.

Another object is to provide a chuck with a faster, more reliable means for attaching the workpiece-engaging part to the carrier part.

A third object is to provide a chuck of this type with a radial locking means.

A further object is to allow a chuck of this type to carry an interchangeable work-engaging jaw of the conventional type as well as one of the improved jaws described herein.

SUMMARY OF THE INVENTION

These and other objects are attained by the present invention in a chuck of the above-described general type wherein each jaw comprises a carrier part with a dovetail-shaped transverse bar mating with a dovetail-shaped transverse groove of a workpiece-engaging part, securely held by a radial clamping member. The radial clamping means urges the bar and the groove into firm contact, since, by abutting on a sloping wall of the bar, its radial force also works axially to hold the workpiece-engaging part to the carrier.

Fast removal of the workpiece-engaging part is effected by loosening the clamping means. This allows the workpiece-engaging part to be pulled axially away from the carrier, until its guide edge emerges from the radial groove of the carrier. Then, a transverse motion of the workpiece-engaging part disengages the bar and the groove, and the part is free. Reattachment is accomplished just as easily.

When the carrier is provided with a radial groove of internal T or dovetail shape, and fitted with a mating slide, the bar can be attached directly to the slide.

When a carrier is thus provided and the bar is removed, a conventional chuck jaw can be radially inserted without need for special machining.

BRIEF DESCRIPTION OF THE DRAWING

These and other objects, features and advantages of my present invention will become more readily apparent from the following description, reference being made to the accompanying drawing in which.

SPECIFIC DESCRIPTION OF THE INVENTION

Figure 1:
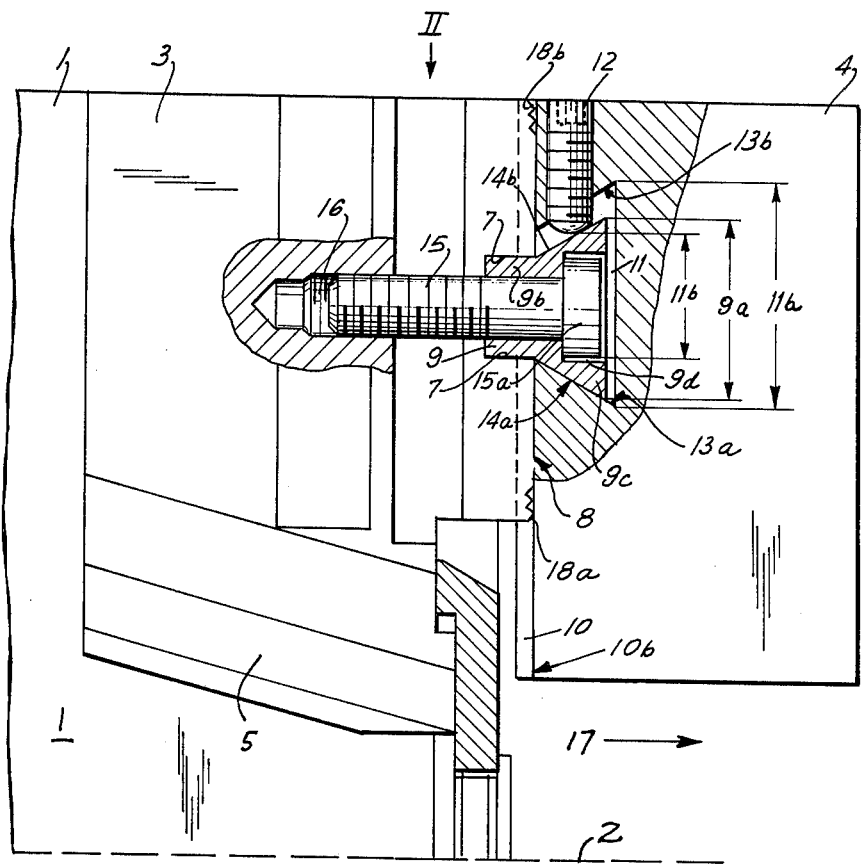
FIG. 1 is a partial sectional view of one chuck jaw in accordance with the present invention.
Figure 2:
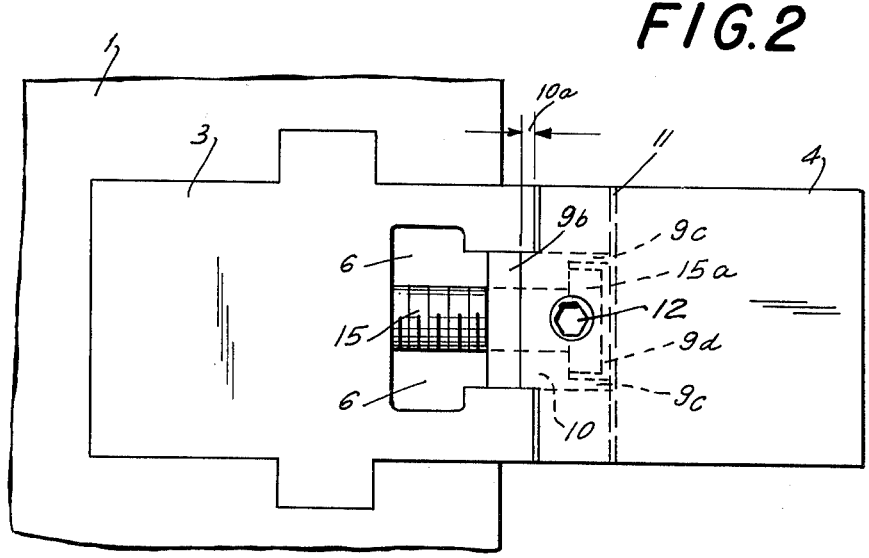
FIG. 2 is another fragmentary view of the chuck jaw taken in the direction of arrow II of FIG. 1.
Figure 5:
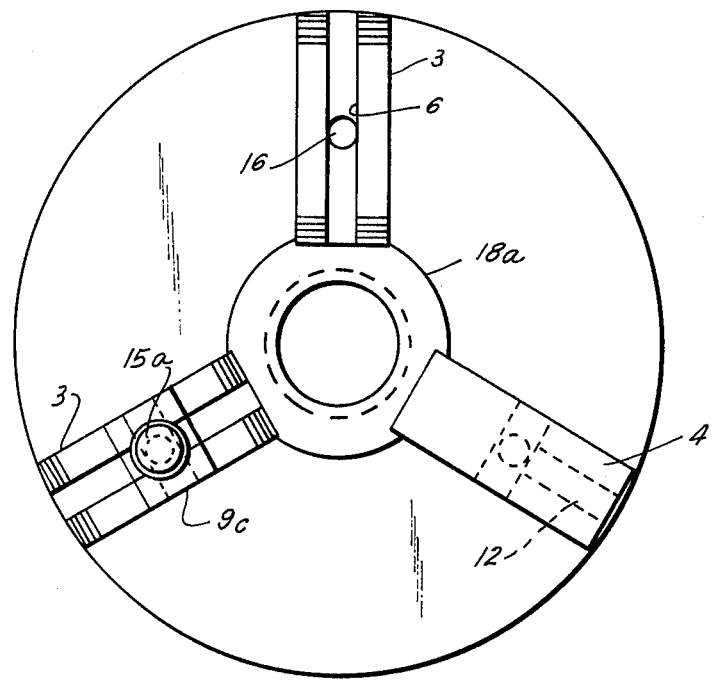
FIG. 5 is an axial (front) view of the chuck with two of the workpiece-engaging parts and one of the dovetail bars removed.

As can be seen from FIGS. 1, 2 and 5 a chuck body rotates about an axis 2 and moveably mounts a plurality (e.g. three) of two-part jaws. Each jaw comprises a carrier 3 and a workpiece-engaging part 4, on a guide 5.

The carrier 3 is formed on its axially turned face 8 with a radial groove 6 which mates with a guide edge 10 of the workpiece-engaging part 4.

A transverse slot 7 in the carrier face 8 accepts a transverse bar 9, which is fastened to the carrier 3 by a headed screw 15. The screw 15 seats in a female thread 16 in the carrier 3. A head 15a of the screw 15 fits into a recess 9d in the bar 9. The bar 9 is formed in a dovetail-shaped profile comprising a prismatic shank 9b and a flare 9c. A transverse groove 11 in the workpiece-engaging part 4 forms a dovetail-shaped profile geometrically similar to that of the bar 9. The shank 9b has flanks which lie against the flanks of groove 6 to maintain the tangential orientation of the bar.

When the bar 9 engages the transverse groove 11, a maximum height 11a of the groove 11 exceeds a maximum height 9a of the bar 9. The minimum height 11b of the groove 11, being smaller than the maximum height 9a of the flare 9c, permits a clearance in a direction 17 at least equal to a depth of engagement 10a of the guide edge 10 in the radial groove 6. A radial set screw 12 is provided when the workpiece-engaging part 4 which penetrates a wall 13b of the groove 11 and confronts a wall 14b of the bar 9, urging an opposite wall 14a of the bar 9 into contact with a wall 13a of the groove 11.

A plurality of serrations 18a, 18b on the face 8 confronts a corresponding face 10b of the work-engaging part 4.

Figure 3:
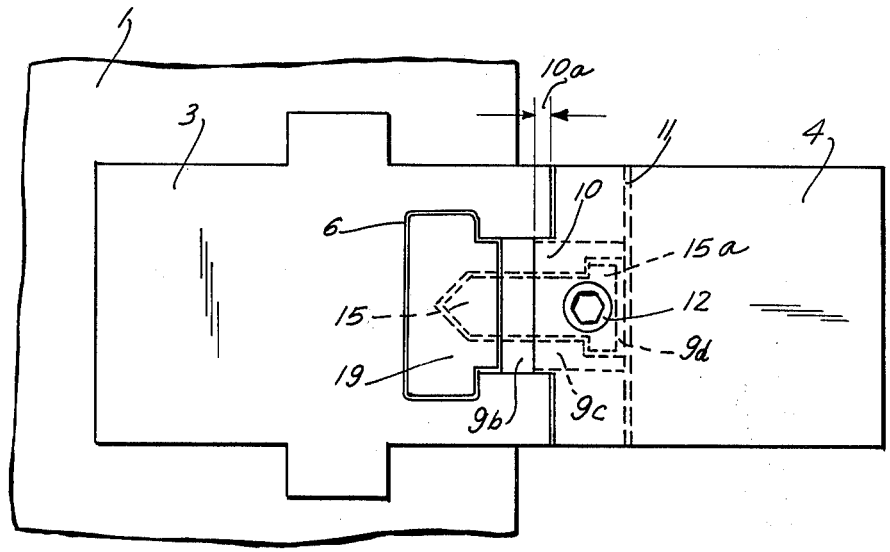
FIG. 3 shows another embodiment of the invention in the same view as FIG. 2.

FIG. 3 shows a two-part jaw according to the present invention in which the T-shaped internal groove 6 of the carrier 3 has been provided with a mating slide 19. The headed screw 15 is threaded into the slide 19.

Figure 4:
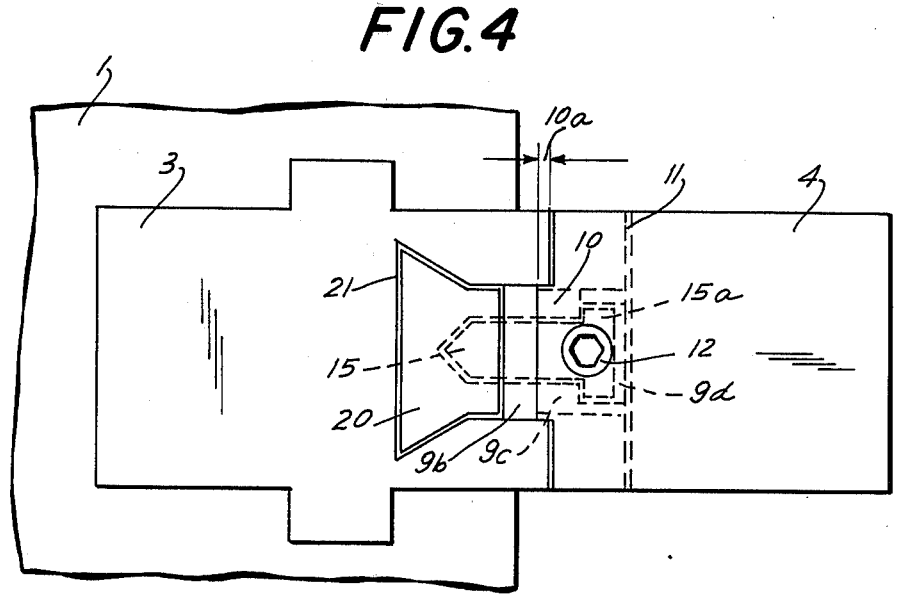
FIG. 4 is yet another embodiment of the invention in the same view as FIGS. 2 and 3.

FIG. 4 shows a dovetail-shaped slide 20 fastened to a dovetail-shaped internal groove 21 in the above manner.

Figure 6:
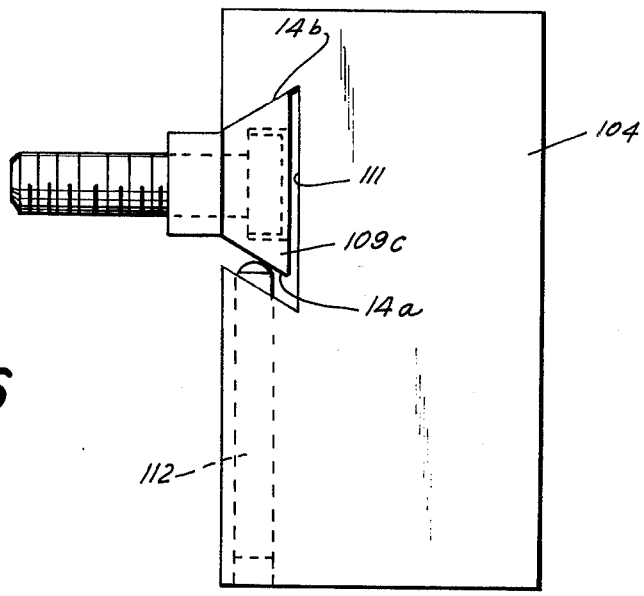
FIG. 6 is a view of the assembly of a bar and workpiece-engaging part in a modification as seen in side elevation.

FIG. 6 illustrates a kinematic reversal of the system of FIGS. 1 and 2 whereby a radially inwardly extending screw 112 bears against the dovetail flank 14a and forces the dovetail flank 14b against the juxtapose wall of the groove 111 of the workpiece-engaging part 104. The dovetail portion 109c of the bar is, in profile, geometrically similar to the groove 111.

Radial movement of the jaws via the slide 5 can be effected manually, pneumatically or hydraulically, e.g. by wedging means of conventional construction. Preferably the radial actuating means corresponds to those described in German Pat. No. 1,922,499 or U.S. Pat. No. 3,926,446. Conventional jaws of the type described in this patent can be interchanged with the two-part jaws of this application as desired.

I claim:

1. A chuck comprising a body rotatable about an axis, a plurality of two-part jaws spaced about said axis and radially displaceable to engage a workpiece, each of said jaws including:

a carrier forming one jaw part and disposed on said chuck body, having a face turned in the axial direction, a radial groove formed in said face, a workpiece-engaging part with a radial guide edge mating with said radial groove of said carrier on said face, a groove of dovetail-shaped profile formed in said workpiece-engaging part transverse to said radial groove, a transverse bar of dovetail-shaped profile geometrically similar to said transverse groove projecting beyond said face of said carrier, said dovetail-shaped profile of said transverse groove being larger than said dovetail-shaped profile of said transverse bar to form an axial clearance between said transverse groove and said transverse bar at least equal to depth of engagement of said guide edge of said jaw with said radial groove of said carrier, and a radial clamping member provided on said workpiece-engaging part urging said bar against an opposite wall of said transverse groove.

2. A chuck as defined in claim 1 wherein said radial clamping member comprises a setscrew.

3. A chuck as defined in claim 2 wherein said transverse groove penetrates at least one lateral wall of said workpiece-engaging part.

4. A chuck as defined in claim 3 wherein said face is provided with serrations to securely grip said workpiece-engaging part.

5. A chuck as defined in claim 4 wherein said cross bar is provided with a means for attaching it to said carrier.

6. A chuck as defined in claim 5 wherein said means for attaching comprises a head screw passing through said bar, said screw being threaded into said carrier, said bar being provided with a recess which accepts a head of said screw.

7. A chuck as defined in claim 4 wherein said radial groove carries an internal profile, said internal profile being provided with a mating slide.

8. A chuck as defined in claim 7 wherein said bar is provided with a means for attaching it to said slide.

9. A chuck as defined in claim 8 wherein said attaching means comprises a screw passing through said bar being threaded into said slide.

10. A chuck as defined in claim 9 wherein said internal profile is provided with a T-shape.

11. A chuck as defined in claim 9 wherein said internal profile is provided with a dovetail shape.

12. A chuck as defined in claim 11 wherein said radial groove can accept a traditional chuck jaw upon removal of said bar.

* * * * *